Oct. 21, 1941.    C. B. SPASE    2,259,784
FRICTION CLUTCH
Filed July 22, 1940
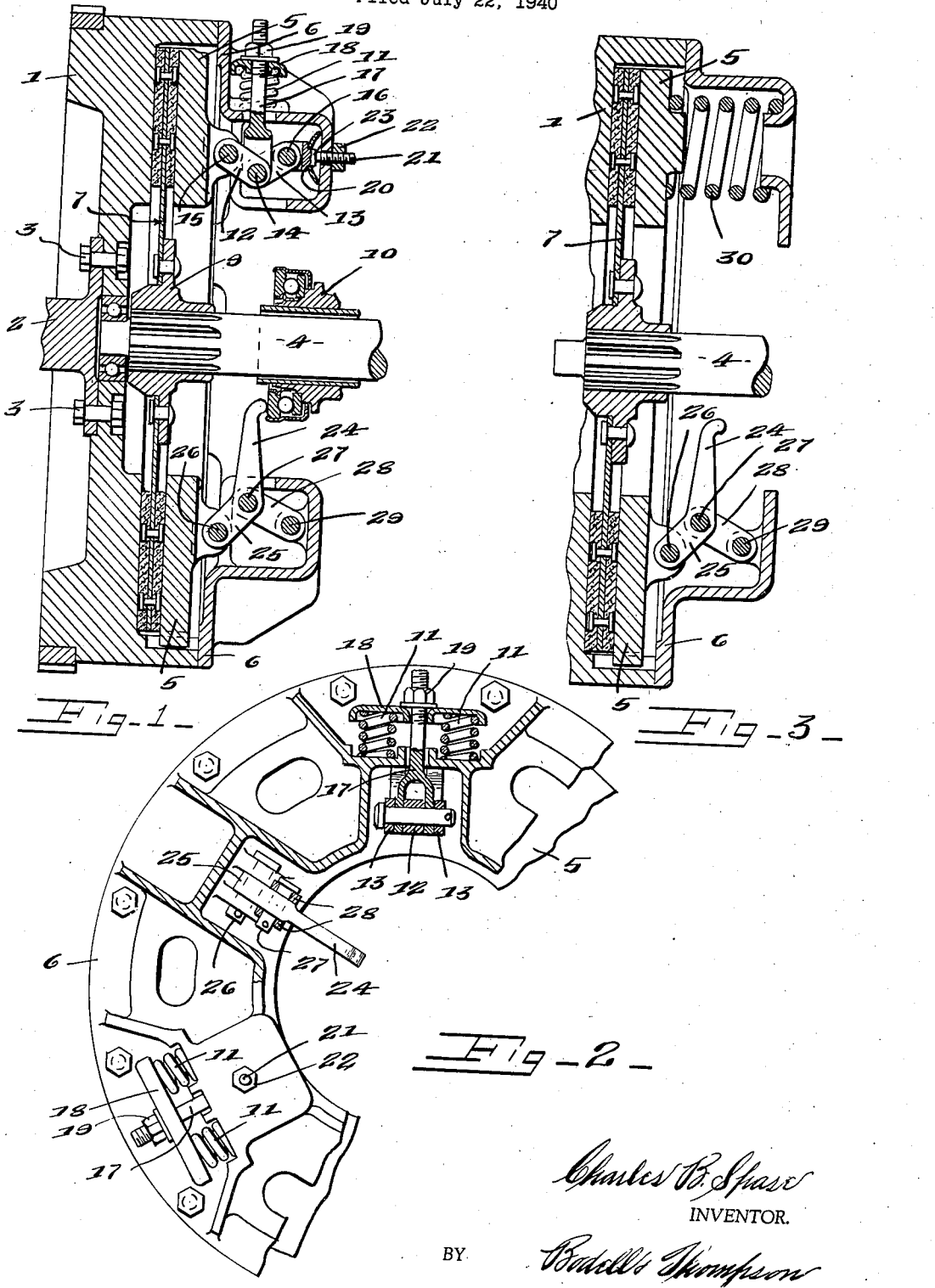
Charles B. Spase
INVENTOR.
BY Bodell & Thompson
ATTORNEYS.

Patented Oct. 21, 1941

2,259,784

UNITED STATES PATENT OFFICE 2,259,784

FRICTION CLUTCH

Charles B. Spase, Nedrow, N. Y., assignor to W. C. Lipe, Inc., Syracuse, N. Y., a corporation of New York Application July 22, 1940, Serial No. 346,766

4 Claims. (Cl. 192—68)

This invention relates to friction clutches, such as are used in the automotive industry, and of the type disclosed in my pending application, Serial Number 338,067, filed May 3, 1940, and has for its object what might be termed dual ratio clutch, or a clutch in which the leverage ratio utilized for disengaging the clutch is greater than the leverage ratio employed when engaging the clutch, so that the clutch is releasable with a light force applied by the driver, against the heavy clutch engaging force.

It further has for its object a clutch construction, wherein during engagement, the clutch engaging mechanism is first cushioned, and then during final engagement, the cushioning means is rendered ineffective, so that the final thrust into fully engaged position is through a solid linkage or leverage.

The invention consists in the novel features and in the combinations and constructions hereinafter set forth and claimed.

In describing this invention, reference is had to the accompanying drawing in which like characters designate corresponding parts in all the views.

Figure 1 is a diametrical sectional view, partly in elevation, through a clutch embodying this invention embodying one form of this invention.

Figure 2 is a fragmentary rear elevation, partly in section and parts being omitted, looking to the left in Figure 1.

Figure 3 is a view similar to Figure 1 of a modified form of the invention.

The invention comprises clutch mechanism loaded or operable to automatically engage the clutch, and clutch throw-out mechanism independent of the clutch engaging mechanism and operable by the driver of the vehicle in which the clutch is installed.

The clutch here shown embodying the invention includes, generally, driving and driven elements, a pressure ring rotatable with the driving element and opposed to the same, the driven element including a clutch shaft and a discoidal plate splined thereon and shiftable slightly axially thereof, the plate extending between the pressure ring and the driving element, a back plate structure secured to the driving element, clutch engaging mechanism operating automatically to engage the clutch and clutch disengaging or throw-out mechanism independent of the engaging mechanism embodying lever means of such ratio as to disengage the clutch with relatively light foot pressure on the part of the operator relative to the stronger force tending to hold the clutch engaged, that is, operating through a high leverage ratio.

I designates the driving element, which may be the flywheel of an engine of a vehicle, it being shown as connected to the crank shaft 2, as by bolts 3.

4 designates the clutch shaft or shaft of the driven element; 5 the pressure ring rotatable with the driving element 1; 6 the back plate structure secured to and rotatable with the driving element. 7 designates the friction member, disk or plate of the driven element, which has a hub 9 splined on and shiftable slightly axially of the clutch shaft 4. The disk or plate 7 extends between the pressure ring 5 and the opposing surface of the driving element 1 and is provided with friction facings on opposite sides thereof. The plate 7 and the pressure ring are usually arranged in a cylindrical recess in the driving element 1, and as here shown, the facings of the plate 7 are pressed toward the bottom of the recess by the pressure ring 5. 10 designates the throw-out collar shiftable axially of the clutch shaft 4.

The clutch engaging mechanism shown in Figure 1 comprises a series of clutch springs 11, the force of which is transferred to the pressure ring 5 through leverage mechanism. The leverage mechanism here shown consists of toggle links 12 and 13 pivoted together at like ends at 14 at the joint of the toggle and at their other ends at 15 and 16 respectively to the pressure ring 5 and the back plate. The force of the springs 11 is transferred to the toggle to tend to straighten it through a link 17 pivoted to the joint 14 of the toggle. The springs 11 thrust at like ends against the back plate, and at their other ends against abutments, as 18, on the links 17, the abutments being held in position by nuts as 19 threading on the links 17 against the spring pressure or loading of the springs and are adjustable to equalize the pressure of the springs for the series of toggles, so that the clutch pressure plate is pressed evenly throughout its extent.

As here shown, the toggle links are normally folded radially inward and the springs tend to move the toggles radially out toward straightened position. Also, the springs are located outside of the back plate structure, where they are accessible for adjustment and replacement and also where they are out of the heat generated by the clutch.

Owing to this arrangement of the toggles folding radially inward and the outward radial thrust of the springs, the action of the springs in holding the clutch engaged is augmented by the centrifugal action of the clutch, when in operation. Preferably, means is provided for cushioning the toggles during the first part of the clutch engaging action and limiting the cushioning or yielding action during the final period of clutch engaging action.

As here shown, one of the toggle links, and preferably the link 13, which is pivotally connected to the back plate, thrusts against cushioning means. The link 13 is not directly pivoted to the back plate but to a clevis 20 having a stem 21 slidable through the back plate and having a nut 22 threading thereon against the back plate, and resilient means, as a spring washer, are interposed between the clevis and back plate. The washer permits the toggle to cushion during the first period of the clutch engaging operation. Means is provided for rendering the yielding of the washer ineffective, this being shown as a stop, shoulder or collar 23 on the stem 21 and arranged to thrust against the inner face of the back plate, after the toggle has been straightened a predetermined amount. This predetermined amount or lost motion is adjusted by means of the nut 22.

The throw-out means, in addition to the throw-out collar 10, includes lever means independent of the clutch engaging means, this lever means coacting with the throw-out collar 10 to be actuated thereby and coacting with the pressure ring 5 and the back plate. In the form here shown, this lever means comprises a lever 24 coacting with the throw-out collar 10 and having an angular arm 25 at its outer end pivoted at 26 to the pressure ring, the lever being pivoted at its angle at 27 to one end of a link 28, which is pivoted at its other end at 29 to the back plate. The link 28 and the arm 25 form a toggle and the toggle is folded radially inward and folds farther radially inward during the throwing out operation, and owing to this arrangement, the ratio of the leverage of the throw-out mechanism is greater than the leverage ratio of the toggle links 12 and 13 and pressure applied to the throw-out collar required to disengage the clutch is less than if the leverage of the clutch engaging mechanism and the clutch throw-out mechanism were the same. As seen in Figure 2, the throw-out levers alternate with the clutch engaging toggles.

In Figure 3, a throw-out mechanism independent of the clutch engaging mechanism is shown, but in the form shown in Figure 3, the clutch engaging mechanism is of the conventional type embodying a series of springs 30 thrusting in a direction parallel to the axis of the clutch in opposite directions against the back plate and the pressure ring, these springs being located within the back plate. The construction shown in Figure 3 shows the dual ratio feature applied to a conventional clutch. That shown in Figures 1 and 2 shows the dual ratio feature applied to the clutch of the type shown in my pending application referred to.

What I claim is:

1. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of mechanisms operable to engage and disengage the clutch, the engaging mechanism including toggle links pivotally connected respectively to the pressure ring and the back plate and acting in a general direction parallel to the axis of the clutch, the links being normally arranged in folded position and movable toward straightened position to engage the clutch and stopping short of fully straightened position when the clutch is engaged, a pull link connected to the joint of the toggle and extending radially outward and having an abutment thereon, an abutment stationary with the back plate, a spring thrusting in opposite directions against the abutments to move the links endwise to straighten the toggle, the spring tending to move the pull link radially outward, all whereby as the clutch wears, the toggle links initially take a more straightened position.

2. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of mechanisms operable to engage and disengage the clutch, the engaging mechanism including toggle links pivotally connected respectively to the pressure ring and the back plate and acting in a general direction parallel to the axis of the clutch, the links being normally arranged in folded position and movable toward straightened position to engage the clutch and stopping short of fully straightened position when the clutch is engaged, a pull link connected to the joint of the toggle and extending radially outward and having an abutment thereon, an abutment stationary with the back plate, a spring thrusting in opposite directions against the abutments to move the links endwise to straighten the toggle, the spring tending to move the pull link radially outward, all whereby as the clutch wears, the toggle links initially take a more straightened position, the pull link extending to the outside of the back plate, and the spring being located on the pull link outside of the back plate.

3. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of mechanisms operable to engage and disengage the clutch, the disengaging mechanism including a throw-out collar shiftable along the clutch shaft, toggle links pivotally connected together at like ends and at their other ends to the back plate and the pressure ring, respectively, and a lever coacting with the throw-out collar and with the toggle and rigid with one link thereof, the throw-out toggle being normally folded and movable during the throwing out operation to a greater folded position, wherein the links are at a less angle to each other than when in starting or normal position.

4. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of mechanisms operable to engage and disengage the clutch, the engaging mechanism including toggle links pivotally connected, respectively, to the pressure ring and to the back plate and extending in a general direction parallel to the axis of the clutch, the links being normally arranged in folded position and movable toward straightened position to engage the clutch, a link connected to the joint of the toggle and extending radially outward and having a spring abutment thereon, the link extending to the outside of the back plate, a spring located outside of the back plate and thrusting in opposite directions against the abutment and against the back plate and tending to move the link endwise to straighten the toggle, the disengaging mechanism including a throw-out collar shiftable along the clutch shaft, toggle links pivoted together at like ends and at their outer ends respectively to the pressure ring and the back plate, and a lever coacting with the throw-out collar and with the toggle and being rigid with one of the toggle links, the throw-out toggle being normally arranged in folded position and movable to a different folded position, wherein the toggle links are at a more acute angle during the throwing out operation.

CHARLES B. SPASE.